THOMAS J. CLOSE.

Improvement in Stud Fastenings for Furniture and other Purposes.

No. 4,768. Reissued Feb. 27, 1872.

Witnesses:
Com. P. Wright
Thos. A. Burtt.

Inventor.
Thomas J. Close,
by his atty,
Horace Binney, 3rd.

AM. PHOTO-LITHOGRAPHIC CO. N.Y. (OSBORNE'S PROCESS.)

UNITED STATES PATENT OFFICE.

THOMAS J. CLOSE, OF PHILADELPHIA, PENNSYLVANIA.

IMPROVEMENT IN STUD-FASTENINGS FOR FURNITURE AND FOR OTHER PURPOSES.

Specification forming part of Letters Patent No. 86,644, dated February 9, 1869; reissue No. 3,686, dated October 26, 1869; reissue No. 4,768, dated February 27, 1872.

*To all whom it may concern:*

Be it known that I, THOMAS J. CLOSE, of the city and county of Philadelphia, in the State of Pennsylvania, have invented a certain new and useful Improvement in Stud-Fastenings for Furniture and other purposes; and I do hereby declare the following to be a full, clear, and exact description thereof, which will enable others skilled in the art to which it appertains to make and use my invention, reference being had to the accompanying drawing which forms a part of this specification, and in which—

Figure 1:
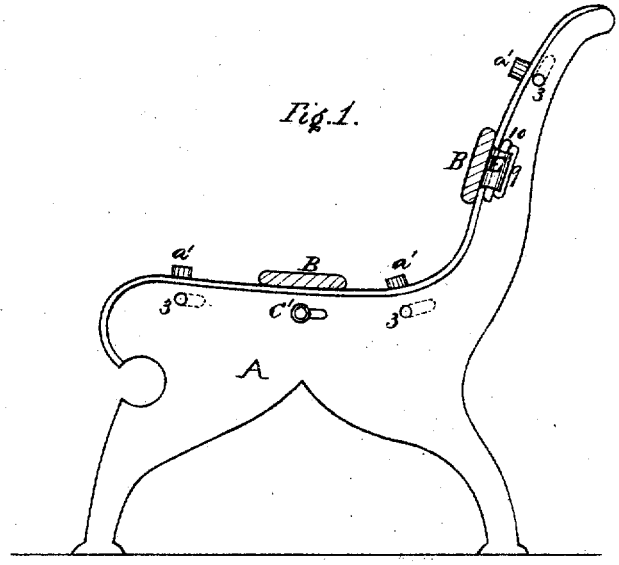
Figure 2:
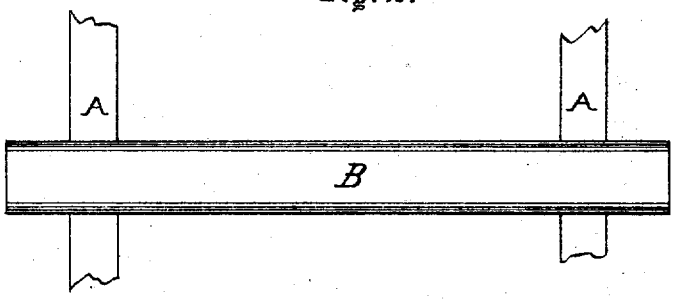
Figure 3:
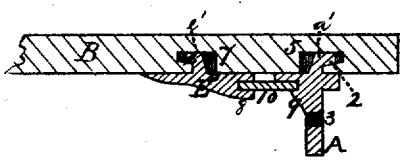
Figure 4:
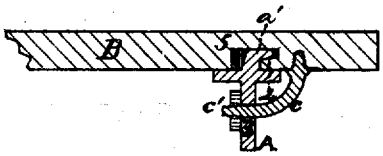

Figure 1 is a side elevation of a settee, showing one of the cast-iron end frames thereof, and two wooden slats attached to the said frame by my improved fastening. Fig. 2 is a plan view of one of the said slats, showing a part of the supporting faces of the two end frames; and Figs. 3 and 4 are transverse sections of different forms of my improvement.

The same parts are denoted by the same letters in all the figures.

My invention is intended to provide a simple and secure method of fastening together parts of structures or of articles of furniture, &c.; and is especially useful where wood or similar material is to be attached to metal, although it may be applied with advantage to other materials. For settees, sewing-machine stands, desks, and similar articles in which wooden tops are commonly supported by metallic frames, also for tables, benches, fences, and a great variety of articles in which it is important to allow for expansion and contraction, or where it is desirable that the component parts should be readily attached and detached without injury, my invention offers a cheap and easy means of attachment.

My said invention consists in the combination of the slope-sided or inclined stud, hereinafter described, and secured to one of the parts to be connected, with a correspondingly-inclined surface formed on the other part. It also consists in the means whereby the said parts are locked in position.

A in the drawing represents a frame, on which are cast or otherwise rigidly attached the studs *a′ a′*. On one side of each of these studs is an inclined plane or sloping surface, 2. When a slat, board, &c., rests on two end frames, as shown in Fig. 2, the sloping surfaces of the studs will, of course, incline toward the contrary sides of the respective frames. B is the slat or other part to be attached to A, and is made with holes 5 corresponding to the studs *a*. The hole 5 is large and deep enough to readily receive the stud *a′* within it, and that side of the hole which is to be in contact with the inclined or sloping surface of the stud is under-cut or sloped to correspond in its direction or inclination with the inclination or slope of the stud, so that when the two inclined surfaces or planes are pressed together by sliding the slat B lengthwise, the said inclined or sloping surfaces will slide upon each other, and thus draw the parts A and B into closer contact. At a short distance from the hole 5 another like hole, 7, is made in B, but with its sloping or under-cut side inclining in a direction opposite to that of hole 5, and into this hole 7 is inserted the slope-sided stud *e′* (like the stud *a′*) on the abutting-plate E. In one end of this plate E there is a groove, 8, corresponding with a groove, 9, in the frame A; and into these two grooves is fitted the key-wedge 10, so that when the studs *e′* and *a′* are properly inserted into their respective holes 7 and 5, if the wedge be driven inward, the plate E will serve as an abutment and hold the parts rigidly together.

Instead of the abutment-plate and wedge a curved draw-bolt, *c*, may be used. For this purpose a slot or hole, 3, is made through the side of the frame A, as shown, so that when the one end of the bolt *c* is screwed into the under side of B, as shown in Fig. 4, the other end can be inserted into the hole 3 and a screw-nut, *c′*, applied against the side of the frame, so as to draw and hold A and B tightly together.

What I claim as my invention, and desire to secure by Letters Patent of the United States, is—

1. The combination, operating as described, of a slope-sided or inclined stud on the part A with a correspondingly-inclined surface on the part B.

2. The combination, operating as described, of the parts A and B, abutting-plate E, and wedge 10.

3. The combination, operating as described, of the parts A and B with the curved draw-bolt *c* and nut *c′*.

THOS. J. CLOSE.

Witnesses:
WM. R. WRIGHT,
THOS. A. BURTT.